United States Patent Office.

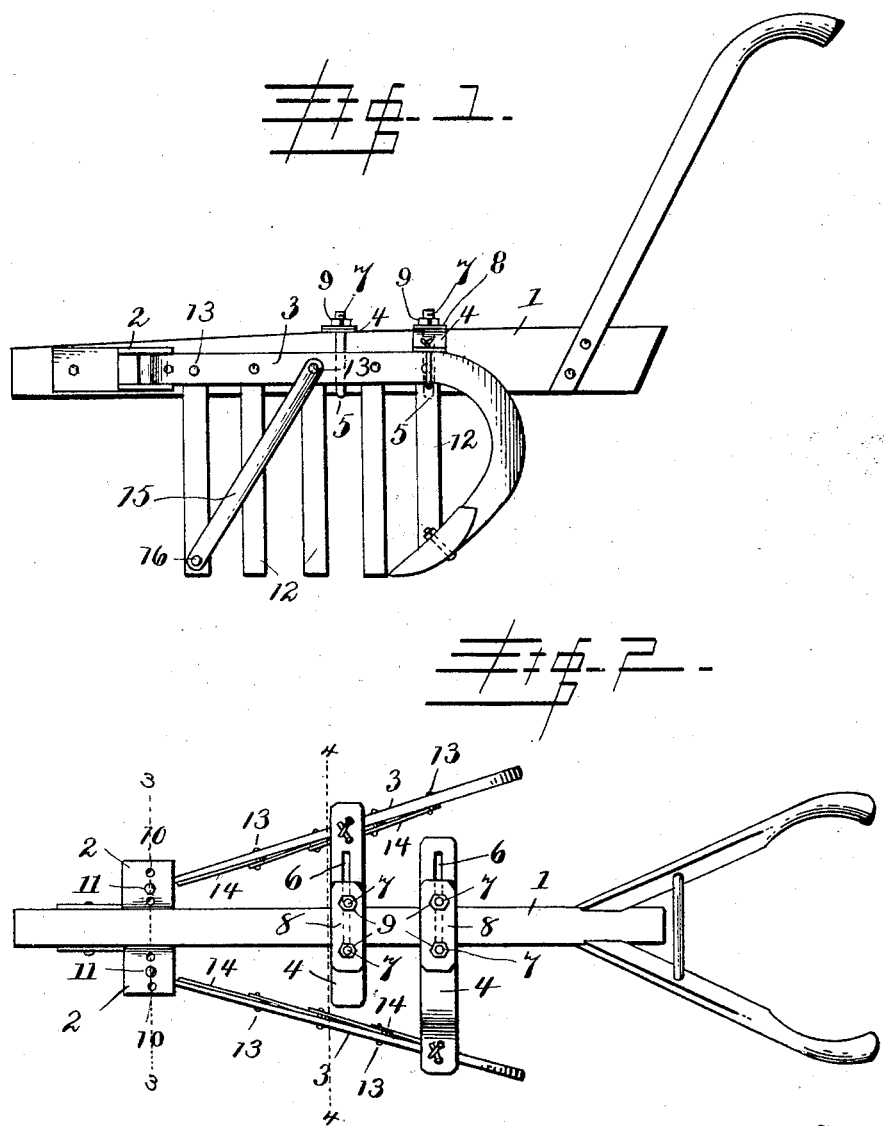

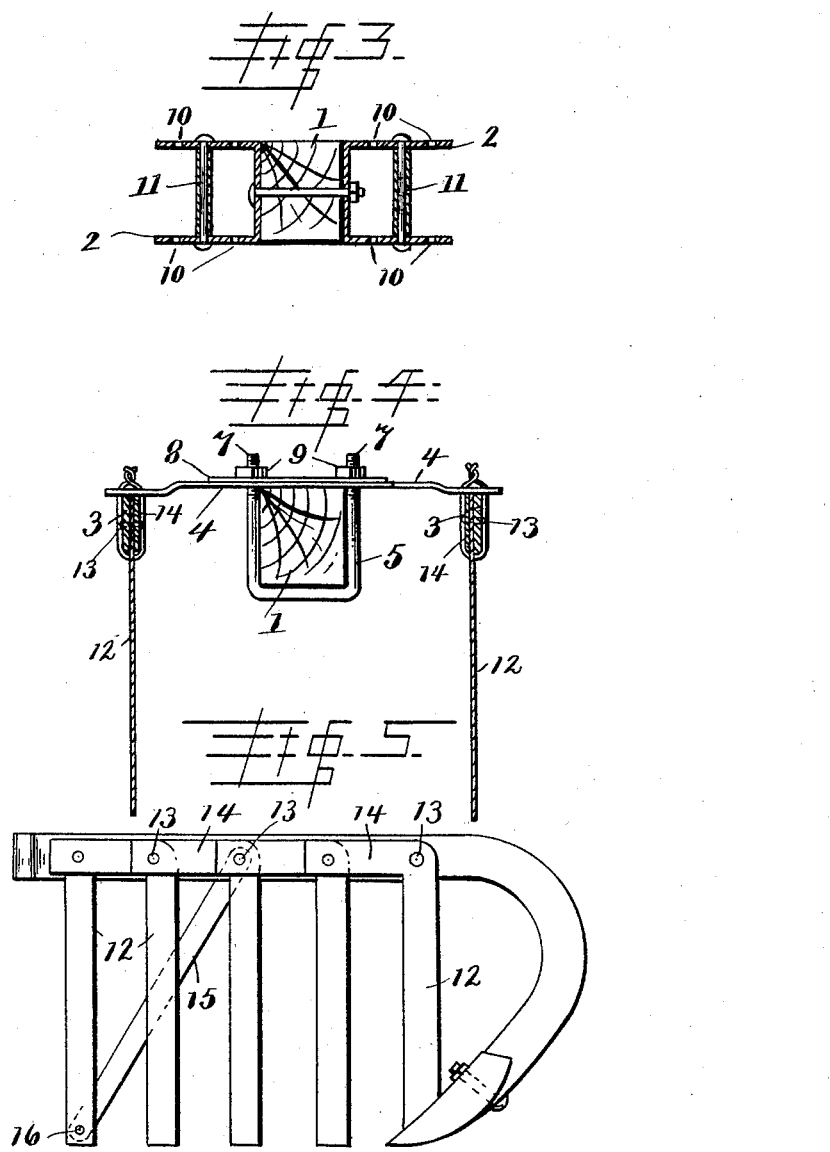

WILLIAM A. SLAY, OF PENTON, ALABAMA.

COMBINATION CORN AND COTTON CULTIVATOR.

SPECIFICATION forming part of Letters Patent No. 612,876, dated October 25, 1898.

Application filed August 2, 1897. Serial No. 646,837. (No model.)

*To all whom it may concern:*

Be it known that I, WILLIAM A. SLAY, a citizen of the United States, residing at Penton, in the county of Chambers and State of Alabama, have invented certain new and useful Improvements in a Combination Corn and Cotton Cultivator; and I do declare the following to be a full, clear, and exact description of the invention, such as will enable others skilled in the art to which it appertains to make and use the same.

My invention relates to a novel form of plow or cultivator, and more particularly to that class employed in the cultivation of cotton, corn, and similar drilled crops; and the object is to increase the effectiveness and utility of the implement without materially adding to the cost or expense of operating the same.

To these ends the invention consists in the construction, combination, and arrangement of the several parts of the same, as will be hereinafter more fully described, and particularly pointed out in the claim.

In the accompanying drawings the same reference characters indicate the same parts of the invention.

Figure 1 is a side elevation of my improved plow or cultivator. Fig. 2 is a top plan view of the same. Fig. 3 is a transverse section on the line 3 3 of Fig. 2. Fig. 4 is a similar view on the line 4 4 of Fig. 2. Fig. 5 is a side elevation of one of the auxiliary beams, taken from the side nearest the plow-beam.

1 represents the beam, and 2 2 lateral brackets fixed to the opposite sides of the beam near its forward end, and 3 3 represent auxiliary beams pivoted at their forward ends in the brackets 2 2 and extending rearwardly in the same horizontal plane with the plow-beam, but diverging laterally, as shown in Fig. 2, and their rear ends terminate in the forwardly-curved standards, as shown, to which are removably secured the usual cultivator-blades employed on this class of implements.

4 4 represent lateral braces secured at their outer ends to the auxiliary beams 3 3 and adjustably secured at their inner ends to the clips 5 5, which encompass the plow-beam. These lateral braces are each provided with a longitudinal slot 6, through which the threaded ends 7 7 of the clips 5 5 pass, and when the plates 8 8 are drawn down on the plow-beam by means of the nuts 9 9 on said plates the inner ends of the braces are firmly clamped between the plates and the beam.

It will be noted in the plan view that the brackets 2 2 are each provided with a series of bolt-holes 10 10 to receive the bolts 11, which pivotally secure the forward end of the beams 3 3 in place, and by this means the forward ends of said auxiliary beams may be adjusted with reference to the draft-beam 1.

12 12 represent a series of vertical blades secured to the beams by the bolts 13 13, and each blade except the foremost one on each beam is formed with an integral right-angular arm 14, the forwardly-projecting end of which is secured to the beam by the bolt which secures the blade immediately in front, so that each arm acts as a brace for its particular blade to insure the necessary strength and rigidity. The foremost blade of each set, however, is provided with a diagonal brace 15, fixed at its forward end to said blade by the bolt 16 and at its rear end to the auxiliary beam by one of the bolts 13, securing the rearward blades to said beam. It will thus be seen that the diagonal brace 15 not only acts as a longitudinal brace for the first blade, but also as a lateral brace for the next succeeding blade, as shown.

A cultivator of this description may be very advantageously employed in hilling up the rows when the plants first begin to sprout by driving it immediately over the rows and as the plants increase in size by driving between the rows and loosening up the soil on the adjoining sides of the contiguous rows.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A cultivator of the class described comprising the central draft-beam, the brackets 2, 2, fixed to the opposite sides of the forward end of said beam, the auxiliary beams 3, 3, pivoted at their forward ends in said brackets, the braces 4, 4, independently connecting the rear ends of said beams 3, 3, to said central beam, the series of vertical blades 12, 12, fixed at their upper ends to said beams 3, 3, and the lateral diagonal brace 15, extending from the lower end of each foremost blade of each series, to its respective auxiliary beam, substantially as shown.

In testimony whereof I hereunto affix my signature in presence of two witnesses.

WM. A. SLAY.

Witnesses:
S. M. EDGE,
J. G. BOWEN.